Figure 5:
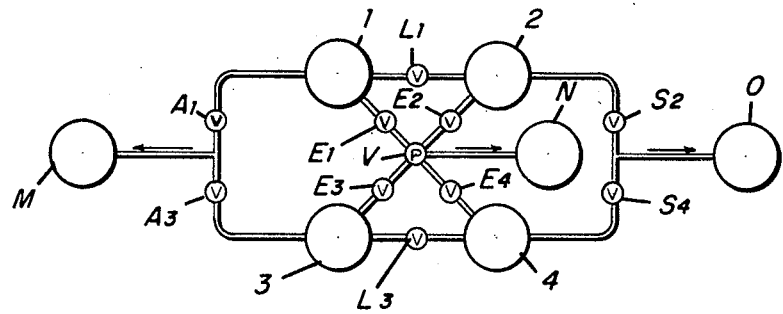

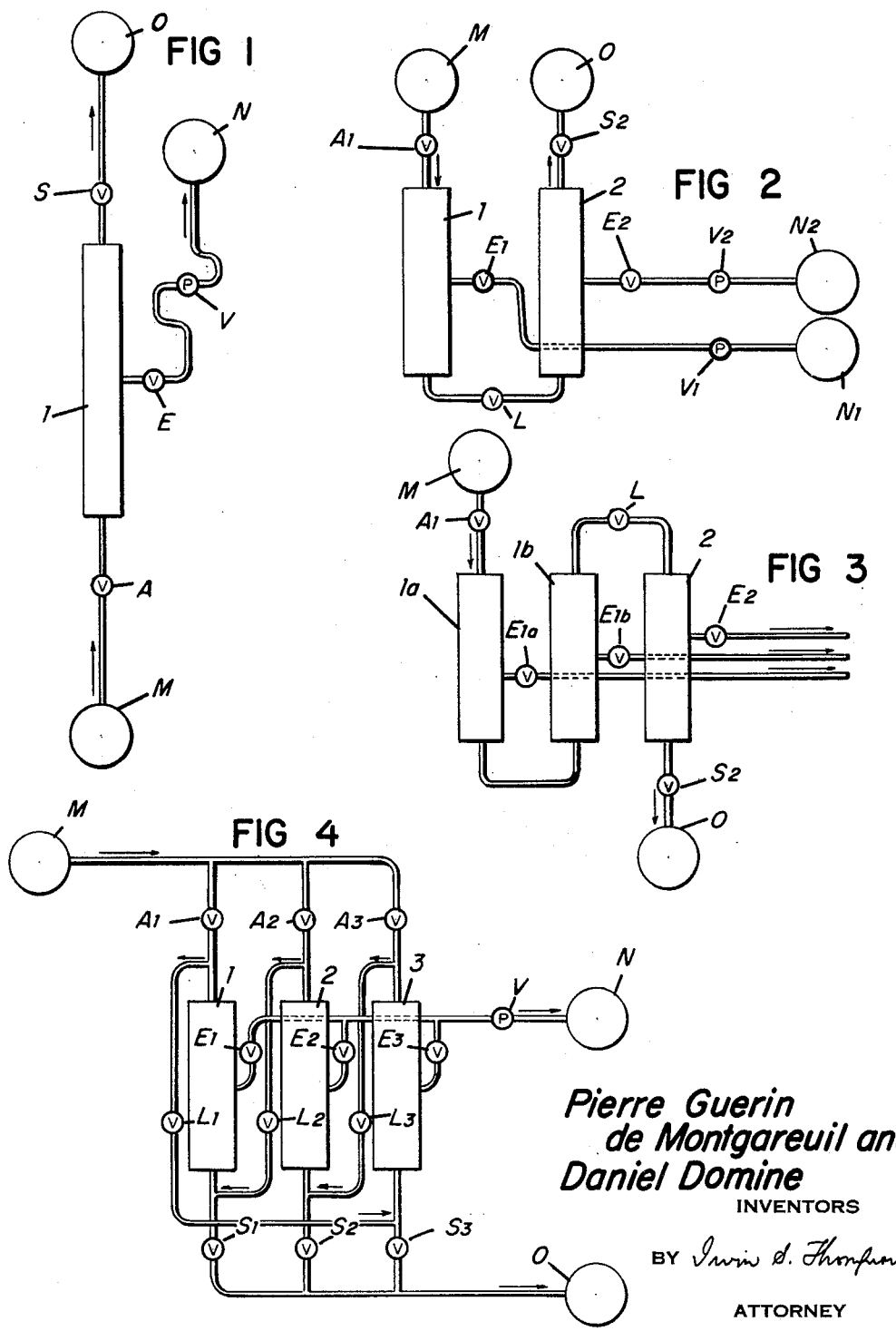

Nov. 3, 1964   P. GUERIN DE MONTGAREUIL ETAL   3,155,468
PROCESS FOR SEPARATING A BINARY GASEOUS MIXTURE BY ADSORPTION
Filed Nov. 10, 1958                         2 Sheets-Sheet 2

Pierre Guerin
   de Montgareuil and
Daniel Domine
                INVENTORS

BY *Irwin N. Thompson*

ATTORNEY 3,155,468
PROCESS FOR SEPARATING A BINARY GASEOUS MIXTURE BY ADSORPTION
Pierre Guérin de Montgareuil, Paris, and Daniel Dominé, Meudon, France, assignors to L'Air Liquide Societe Anonyme pour l'Etude et l'Exploitation des Procedes Georges Claude, Paris, France
Filed Nov. 10, 1958, Ser. No. 772,961
Claims priority, application France, Nov. 21, 1957, 752,290, Patent 1,223,261
7 Claims. (Cl. 55—25)

The present invention has for its object a process for separating a binary gaseous mixture, by adsorption.

Applications of the phenomenon of adsorption of gases on solids have long been known in industrial practice, but so far these applications have in fact been limited to the removal of a vapour present in small proportions in a gas or a mixture of gases, as for example in the removal of benzene from coal gases, in the extraction of solvents, in the recovery of the oil from a mixture of gaseous hydrocarbons, or even in the drying of gases. In all these cases, the adsorbent strongly fixes the vapour to be removed and adsorbs practically none of the carrier gas. The adsorption is effected by the gas to be scrubbed being passed through an adsorbent bed at constant pressure and continuously, provided saturation is not reached; the desorption is generally effected by heating, with or without flushing with a current of inert gas.

The present invention, on the other hand, relates to the separation of a binary gaseous mixture (or a mixture behaving as such) into its constituents and it has for its object to improve the results so far obtained, which did not permit in practice the use of adsorption in this field.

It has in fact been discovered that when an adsorbent is capable of adsorbing comparable although different quantities of the two component gases at a given temperature, but at a speed sufficiently high with respect to the speed of extragranular diffusion of the mixture into the adsorbent bed, and when it may be degasified substantially at the same temperature by the sole action of vacuum, it is possible to amplify the results already obtained by simply bringing the adsorbent and the gaseous mixture into contact, to the point of making separation by adsorption a process which can be exploited industrially.

Among the adsorbents capable of adsorbing comparable but different quantities of the gases of a binary mixture at a given temperature and capable of being degasified, substantially at the same temperature, under the sole action of a vacuum, it is possible to mention the natural crystallized zeolites, such as analcite, chabazite, faujasite, or artificial crystallised zeolites such as those synthesised in Great Britain by R. M. Barrer (British Patent No. 574,911 of September 22, 1943) and in the United States by Union Carbide Corporation (French Patents Nos. 1,117,756 of December 22, 1954, and 1,117,776 of December 24, 1954).

The following table gives by way of example the quantities of nitrogen and oxygen adsorbed at ordinary temperature and atmospheric pressure per gram of silica gel and per gram of the four zeolites marketed by the Union Carbide Corporation under the names 4A, 5A, 13X and 10X:

| | Volume adsorbed at 760 mm. Hg and at 20° C. in cc./g. | |
|---|---|---|
| | $N_2$ | $O_2$ |
| Zeolite 4A | 6.2 | 2.2 |
| Zeolite 5A | 10.9 | 3.2 |
| Zeolite 13X | 6.7 | 2.1 |
| Zeolite 10X | 6.0 | 2.1 |
| Silica gel | 1.27 | 1.18 |

It will be seen from this table that the gas quantities adsorbed by the silica gel are very small by comparison with the quantities adsorbed by the four zeolites; in addition, the relative difference between the adsorbed quantities of nitrogen and oxygen are much smaller for silica gel than the four zeolites. This clear superiority of the zeolites over the conventional adsorbents of the silica gel type is well known and this has already led to attempts to use both natural and synthetic zeolites as separating agent for a gaseous mixture. However, if for example a zeolite is brought into contact with a mixture of oxygen and nitrogen at atmospheric pressure and ordinary temperature, it is found that the increase in oxygen content of the gaseous phase at equilibrium is relatively small and that a large number of operations of the same type would be necessary to reach an oxygen content sufficient for any industrial use. Raising the pressure or lowering the adsorption temperature does not permit conveniently overcoming this difficulty.

On the other hand, the process forming the subject of the invention makes it possible to obtain a much higher concentration in a single step, provided that the adsorbent has one additional property; that of adsorbing the gaseous mixture to be separated at a sufficiently high speed by comparison with the speed of extragranular diffusion of this mixture into the adsorbent bed. It does in actual fact bring into operation a physical process, which is provided by the following basic experiment.

A cylindrical chamber with a vertical axis and a height of 10 cm. is maintained at a temperature in the region of 20° C. by a thermostat device. It contains 20 g. of a zeolite carefully dehydrated at high temperature and degasified under vacuum. A certain quantity of a mixture of oxygen and nitrogen with 20% of oxygen is introduced into the chamber through the bottom thereof until the pressure in the chamber is approximately equal to atmospheric pressure; small quantities of gas are then removed at the top at successive intervals so as to know the composition of this gas at a function of time.

By repeating this experiment with the four zeolites 4A, 5A, 13X and 10X, it is found that in all cases the final content obtained at equilibrium is exactly the same as that which would be obtained by simply bringing the mixture into contact with each of the zeolites, but equilibrium is obtained by radically opposed paths for zeolite 4A, on the one hand, and for zeolites 5A, 13X and 10X on the other hand. Actually, with zeolite 4A, the gas content removed at the top five minutes after introducing the mixture is 21% and then increases regularly to reach, after approximately one hour, the equilibrium concentration which is 35.1%. With zeolites 5A, 13X and 10X, on the contrary, the gas content removed at the top five minutes after the mixture is introduced, is respectively 78%, 54% and 51%; it then decreases regularly to reach, after approximately one to two hours, the equilibrium concentration which is respectively 39.4%, 38% and 35%.

Such a difference can be explained by the kinetics of the adsorption process. Immediately after the gaseous mixture is introduced, there is in effect competition between the intracrystalline diffusion, which controls the adsorption speed, and the extragranular diffusion on which depends the speed of extragranular diffusion into the adsorbent bed. The speed of introcrystalline diffusion is too slow with the type 4A zeolite to play an appreciable part before the mixture reaches the top of the chamber in scarcely modified form. There is then observed a simple process of mixed adsorption, the speed of which is regulated by that of the adsorption of the nitrogen, which is the slower phenomenon. On the contrary, with the zeolites of types 5A, 13X and 10X, the crystalline structure of which is more open, the intracrystalline diffusion is sufficiently rapid for the gas content to be modified by the adsorption substantially in the sense of an enrichment with oxygen as it progresses in the chamber and simultaneously for the gas which is more readily adsorbable (the nitrogen) to displace in its favour the gas which is less readily adsorbable (the oxygen). The diffusion then very slowly equalises the contents by bringing them to the value corresponding to the homogeneous mixture of equilibrium.

The process which forms the subject of the invention exploits methodically the technical effect which has just been described: it is characterized by the fact that a given quantity of mixture under pressure is admitted at the temperature in question into a chamber containing the adsorbent and freed from gas under vacuum, the said quantity being admitted through a first zone of said chamber, that shortly after completing the admission of the mixture, a first gaseous fraction is withdrawn from the chamber through a second zone of the latter spaced from the first, thus lowering the pressure of the chamber to an intermediate value, and a residual gaseous fraction is extracted from the chamber solely under the action of vacuum and at a temperature close to the temperature of admission, it being possible for all these operations to be repeated periodically by introducing at each period, a fresh quantity of the mixture into the chamber, after the residual gaseous fraction of the preceding period has been extracted by vacuum.

By way of example, there are described below and illustrated in the accompanying drawings a number of embodiments as applied to the separation by means of the zeolite 5A of a mixture of oxygen and nitrogen with 21.8% of oxygen. This mixture has been chosen, because as regards zeolite 5A, argon behaves like oxygen, the quantities adsorbed and the separation speeds being very similar. The problem of the separation of air, considered as a binary mixture of nitrogen on the one hand and oxygen and argon the other hand, is thus practically identical to that of a mixture of oxygen and nitrogen in which the argon is replaced quantitatively by oxygen, this giving an oxygen proportion of 21.8%.

FIGURE 1 of the accompanying drawing shows diagrammatically the elementary device for carrying out the invention and comprising only one chamber formed by a single vessel.

FIGURES 2 to 7 show diagrammatically six arrangements for carrying out the process according to different embodiments of the invention.

The arrangement shown in FIGURE 1 is formed essentially by a fluid-tight cylindrical chamber 1 with a diameter of 4 cm. and a height of 35 cm. This chamber is preferably disposed vertically and is provided at one end, for example at its bottom end, with an inlet cock A by which the bottom end can be brought into communication with a source M of mixture under pressure: it is provided at its other end with a withdrawal cock S, by which the top of the chamber can be brought into communication with a gas-holder O; finally, it is provided at any suitable point on its periphery, for example at a middle point in its height, with an extraction cock E by which the chamber can be brought into communication by way of a primary vacuum pump V (which can be a rotating vane pump) with a second gas-holder N.

The said chamber is kept by means of a thermostat or other device at a temperature in the region of 20° C. and is filled with 600 g. of zeolite 5A which has been dried in a current of inert gas at about 300° C. After extraction of gas at a vacuum of approximately 0.5 to 1 mm. Hg, a certain quantity of mixture is admitted at ordinary temperature through the cock or valve A in accordance with the invention. The period of admission is approximately 40 seconds; the effective pressure reached in the chamber 1 on stopping the admission is approximately 1 kg./cm.$^2$.

Shortly after closing the valve A, the withdrawal valve S is opened and a gaseous fraction enriched with oxygen is collected in the gas-holder O; the duration of this withdrawal is also about 40 seconds; the pressure reached in the chamber 1 on completing the withdrawal is approximately equal to atmospheric pressure.

The valve S is then closed and the valve E is opened to extract the residual gaseous fraction by means of the vacuum pump V. The extraction period is also 40 seconds; the vacuum reached in the chamber 1 on completing the extraction is approximately 0.5 to 1 mm. Hg, the residual fraction is collected in the gas-holder N.

The results are as follows: the quantity of mixture treated is 5.84 litres of 21.8% mixture which consequently contains 1.27 litres of pure oxygen, converted to normal pressure; in the gas-holder O, there is found 0.35 litre, converted to normal pressure, of a gas containing 89% of oxygen (i.e., 0.31 litre of pure oxygen); in the gas-holder N, there are found 5.49 litres, converted to normal pressure, of a gas with 17.5% of oxygen (i.e., 0.96 litre of pure oxygen). The rate of extraction of oxygen is thus 24.4% for a content of 89% and the quantity of adsorbent employed is 1930 g. per litre of oxygen, calculated as pure oxygen.

By relating the results of the basic experiment previously described, it will be found that the content of 89% is high. It is in fact necessary to take into account that the physical process defined above is operative not only during the admission, but also during the withdrawal, the gas continuing to travel in the same direction.

It will also be noted that the elongated form of the chamber is favourable for a long travel of the gas, and consequently to a high separation factor; thus, whatever the shape of the chamber, it will obviously be advisable for the admission zone and the withdrawal zone to be spaced as far apart as possible so that the gas path is the longest possible.

The arrangement of FIGURE 1 can be exploited with different working pressures. With an effective pressure of 1.5 kg./cm.$^2$ on completion of the admission and atmospheric pressure on completion of the withdrawal, the quantity treated is 7.69 litres of 21.8% mixture (i.e., 1.67 litres of pure oxygen); 1.66 litres of a 71.5% gas (i.e., 1.19 litres of pure oxygen) are found in the gas-holder O; 6.03 litres of an 8.0% (i.e., 0.48 litre of pure oxygen) are found in the gas-holder N. The extraction rate is thus 71.3% for a content of 71.5% and the quantity of adsorbent employed is 505 g./l.

With an effective pressure of 2 kg./cm.$^2$ on completion of the admission and atmospheric pressure on completion of the withdrawal, the quantity treated is 9.96 litres of 21.8% mixture (i.e., 2.18 litres of pure oxygen); 3.69 litres of 50.5% gas (i.e., 1.865 litres of pure oxygen) are found in the gas-holder O; 6.27 litres of 5% gas (i.e., 0.315 litre of pure oxygen) are found in the gas-holder N. The rate of extraction is thus 85.5% for a content of 50.5% and the quantity of adsorbent used is 322 g./l.

It will be noted that raising the admission pressure reduces the oxygen content of the enriched fraction, but increases the rate of extraction and reduces the quantity of adsorbent which is required. However, the admission pressure may not in practice exceed a few kg./cm.$^2$, because the relative difference of the quantities of nitrogen and oxygen which are adsorbed decreases when the pressure increases and is cancelled out in the region of 60 to 100 kg./cm.$^2$, depending on the degree of dehydration of the adsorbent, in order then to be reversed.

It is possible to improve simultaneously the content and the rate of extraction by association of several chambers.

In one preferred embodiment, the first gaseous fraction withdrawn from the chamber in accordance with the general definition of the invention is admitted at the rate at which it is withdrawn into a second chamber in the same manner as in the first so that the pressures of the two chambers are balanced, and then, after completing this second admission, another gaseous fraction is withdrawn in the same manner as before from the second chamber, and from the first chamber by way of the second chamber, thus lowering the pressure of the two chambers to a second intermediate value.

The arrangement according to FIGURE 2 comprises two vessels 1 and 2 serving respectively as the first and second chambers as thus defined. The vessel 1 is equipped with an inlet cock $A_1$ which connects it at the source M of the gaseous mixture under pressure, and an extraction valve $E_1$ which is connected to a gas-holder $N_1$ by means of a vacuum pump $V_1$, while the vessel 2 is equipped with a withdrawal cock $S_2$ which connects it to the gas-holder O, and with an extraction valve $E_2$ which connects it to a gas-holder $N_2$, by way of a vacuum pump $V_2$; a connecting cock L enables the two vessels 1 and 2 to be brought in communication with one another.

In accordance with the embodiment defined above, and after removing gas from the two vessels, each filled beforehand with approximately 600 g. of dehydrated zeolite 5A, a certain quantity of mixture is admitted to the vessel 1 through the cock $A_1$. The effective pressure reached on completion of the admission is 3.9 kg./cm.$^2$.

Shortly after closing the cock $A_1$, the connecting cock L is opened, which withdraws gas from the vessel 1 so as to introduce it into the vessel 2, and balances the pressures in the two vessels.

Shortly after completing this balancing of the pressure, the withdrawal cock $S_2$ is opened and a gas fraction enriched with oxygen is collected in the gas-holder O; the pressure of the two chambers, on completing this second withdrawal, is approximately equal to atmospheric pressure.

The cocks L and $S_2$ are then closed and the extraction cocks $E_1$ and $E_2$ are opened. After the extraction, the vacuum attains a value of 0.5 to 1 mm. Hg; the residual fraction of each vessel is separately collected in the gas-holders $N_1$ and $N_2$.

The results are as follows: the quantity of mixture treated is 14.72 litres of mixture with 21.8% of oxygen (i.e., 3.21 litres of oxygen calculated as pure oxygen); 2.80 litres of gas with 97.5% of oxygen (i.e., 2.73 litres of pure oxygen) are found in the gas-holder O; 5.95 litres of 3% gas (i.e., 0.18 litre of pure oxygen) are found in the gas-holder $N_1$; 5.97 litres of gas with 5% oxygen (i.e., 0.30 litre of pure oxygen) are found in the gas-holder $N_2$. The rate of extraction is thus 85% for a content of 97.5%, and the quantity of adsorbent employed is 440 g. per litre of oxygen, calculated as pure oxygen.

A modification of this embodiment consists in continuing the extraction of gas from the vessel 2 during the beginning of the following period while admitting a fresh quantity of gas mixture into the vessel 1. This modification makes it possible to reduce the time of gas extraction by vacuum from the vessel 1 while obtaining similar results.

Another modification of this embodiment consists in only removing gas from the vessel 1 and, in the following period, admitting a fresh quantity of gas mixture directly into the vessel 2 without previous removal of gas, the respective positions between the source of gas mixture and the gas-holder for oxygen-enriched gas of the two vessels then being interchanged. It is advantageous in this modification to determine the working pressure so that after completing the withdrawal from the two vessels, the residual gas fraction of the vessel 2 has a mean strength equal to that of the initial mixture, i.e., 21.8%. The arrangement according to FIGURE 2 enables this last modification to be carried into effect by fixing the pressure of the vessel 1 after admission at 2.6 kg./cm.$^2$. If a first operation is carried out after removing gas from the two vessels, the following results are obtained: the quantity treated is then 13.09 litres of 21.8% mixture (i.e., 2.85 litres of pure oxygen); 1.47 litres of gas with 98% oxygen (i.e., 1.44 litres of pure oxygen) are found in the gas-holder O; 6.20 litres of gas with 3.7% of oxygen (i.e., 0.23 litre of pure oxygen) are found in the gas-holder $N_1$; and if gas had been removed from the vessel 2, 5.42 litres of gas with 21.8% oxygen, the content of the initial mixture (i.e., 1.18 litres of pure oxygen) would be found in the gas-holder $N_2$.

In the second operation, gas is not removed from the vessel 2; experience shows that it is then sufficient to introduce into this vessel a strictly complementary quantity of gas mixture (i.e., 13.09−5.42=7.67 litres) in order to be restored to the preceding case. The rate of extraction under these conditions is 86.2% for the same strength of 98%, but the quantity of adsorbent employed is 832 g. per litre of pure oxygen.

It will be noted that although the quantity of adsorbent required is much greater than in the previous case, the work of extraction is slightly lesser, because it is applied to only one vessel instead of two.

It is possible to reduce the admission pressure at the expense of a slight lowering of the extraction rate, but this could be compensated for by increasing the height of the vessels.

In the case where gas is removed from both chambers, it is sufficient as indicated in FIGURE 3 to increase the capacity of the vessel 1, for example by replacing it with two vessels 1a and 1b with a capacity equal to that of the vessel 1. The vessels 1a and 1b are permanently connected and are filled, like the vessel 2, with approximately 600 g. of dehydrated zeolite 5A.

By working as in accordance with the arrangement of FIGURE 2, and by adopting an admission pressure of 2.6 kg. cm.$^2$, the following results are obtained: the quantity treated is 23.275 litres of 21.8% mixture (i.e., 5.08 litres of pure oxygen); 4.80 litres of 88% gas (i.e., 4.23 litres of pure oxygen) are collected in the gas-holder O; 6.06 litres of 3.8% (i.e., 0.23 litre of pure oxygen) are extracted from the vessel 1a, while 6.365 litres of 4% gas (i.e., 0.255 litre of pure oxygen) are extracted from the vessel 1b. 6.05 litres of 6% gas (i.e., 0.365 litre of pure oxygen) are extracted from the vessel 2. The rate of extraction is thus 83.4% for a content or strength of 88%, and the quantity of adsorbent employed is 425 g. per litre of oxygen, calculated as pure oxygen.

In the case where gas is not removed from the second chamber, the arrangement of FIGURE 3 cannot be used. However, it is sufficient that the first chamber of the general definition of the invention comprises $n$ identical vessels instead of one, and the second chamber always comprises one vessel, the assembly formed by the second chamber and $n-1$ vessels of the first chamber, on the one hand, and one of the vessels of the first chamber, on the other hand, playing in the subsequent period the respective parts which were played by the first chamber and the second chamber in the preceding period.

The arrangement according to FIGURE 4, described by way of example, comprises three vessels 1, 2 and 3, the first two of which act as the first chamber in the initial period and the third as the second chamber. The vessels 1, 2 and 3 are provided with admission cocks $A_1$, $A_2$ and $A_3$ by which they can be connected to the gas mixture source M, withdrawal cocks $S_1$, $S_2$ and $S_3$ by which they can be connected to a gas-holder O, extraction cocks $E_1$, $E_2$ and $E_3$ by which they can be connected through a primary vacuum pump V to a gas-holder N, and finally connecting cocks $L_1$, $L_2$ and $L_3$ by which the vessels can be brought into communication in pairs. Each of the vessels 1, 2 and 3 is filled with approximately 600 g. of dehydrated zeolite 5A.

In a first period, the connecting cock $L_1$ is opened and the assembly of two vessels 1 and 2 forms a single chamber. Operating in the same way as in FIGURE 1, with an effective admission pressure of 2.1 kg./cm.$^2$, the following results are obtained: the treated quantity is 20.49 litres of 21.8% mixture (i.e., 4.48 litres of pure oxygen); 2.80 litres of 98.5% gas (i.e., 2.76 litres of pure oxygen) are collected in the gas-holder O; 6.15 litres of 4% gas (i.e., 0.25 litre of pure oxygen) are extracted from the vessel 1; 6.39 litres of 5.5% gas (i.e., 0.35 litre of pure oxygen) are extracted from the vessel 2; it would be possible to extract from the vessel 3 5.15 litres of a 21.8% gas, which is the strength of the initial mixture (i.e., 1.12 litres of pure oxygen)

In a second period, the connecting cock $L_1$ is closed and the connecting cock $L_2$ is opened so that this time the vessels 3 and 2 form a single chamber; the gas is not extracted from the vessel 3 and the gas mixture is first of all admitted to this vessel 3. In the case of FIGURE 2, experience shows that it is sufficient to introduce the complementary quantity of mixture (i.e.

$$20.49 - 5.15 = 15.34$$

litres) into the vessel 3 so as to be restored to the preceding case. The rate of extraction under these conditions is 82.2% for the same strength of 98.5% and the quantity of adsorbent employed is 652 g. per litre of pure oxygen.

It will be noted that for a substantially identical rate of extraction, the strength is clearly better than in the case where gas is extracted from the three vessels, but this advantage makes necessary a larger number of cocks and a greater complication of the complete apparatus.

The preferred embodiment which has just been described with various modifications comprises only two chambers and two intermediate pressures. However, it may be that in some cases, and especially for other gas mixtures, it would be desirable to have more than two chambers and more than two intermediate pressures, for example three. In this case, after admission of the gas mixture into two successive chambers and withdrawal thereof from these two chambers, the withdrawn gas fraction is admitted at the rate at which it is withdrawn into a third chamber in the same manner as in the first two, so that the pressures of the chambers are balanced, and then, shortly after completing this third admission, another gas fraction is withdrawn in the same way as before from the third chamber, and from the two others by way of the third, thus lowering the pressure of the three chambers to a third intermediate value.

The arrangements described above have an essentially intermittent function. Nevertheless, it is possible to ensure continuous production by suitably grouping several vessels operating in accordance with one of the methods previously described.

FIGURE 5 shows a grouping of four identical vessels 1, 2, 3 and 4, two of which are in the course of being degasified, while the other two are operating like the arrangement of FIGURE 2. For this purpose, the vessels 1 and 3 are provided with admission cocks $A_1$ and $A_3$ and extraction cocks $E_1$ and $E_3$, while the vessels 2 and 4 are equipped with withdrawal cocks $S_2$ and $S_4$ and extraction cocks $E_2$ and $E_4$. Connecting cocks $L_1$ and $L_3$ permit connection of the vessels 1 and 2, and 3 and 4.

It will be noted that, with this grouping, as in those which are hereinafter described, the total period of the cycle is determined by the duration of the gas extraction operation, which is the longest operation. It is possible in the case of FIGURE 5 conveniently to shorten this period by continuing the removal of gas from 4, while feeding into 3, and the removal of gas from 2 while feeding into 1.

It is also possible to ensure continuous production by grouping $2n+1$ identical vessels, $n$ of which are always undergoing gas extraction, while the other $n+1$ vessels are operating as referred to above, when the first chamber comprises $n$ vessels and the second chamber is not freed from gas.

It is also possible to group three vessels in the same way as in FIGURE 4, but this time for obtaining a continuous production. It is sufficient to operate the cocks in such manner that one of the vessels is always in the course of being freed from gas, while the other two function as in the case of FIGURE 2, and conforming to one or other of its two modifications, i.e., with extraction of gas from one or two vessels at each period.

Figure 6:
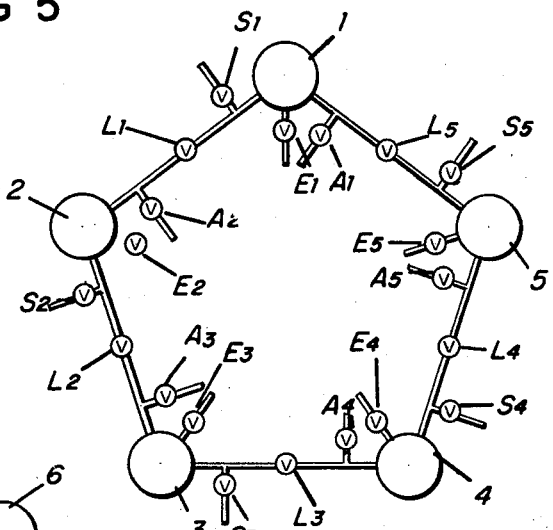

FIGURE 6 illustrates, in the case where $n$ is equal to two, a grouping of five vessels 1, 2, 3, 4 and 5, two of which are always in the course of being freed from gas, while the other three function as the arrangement shown in FIGURE 4.

Each of the five vessels must be equipped with four cocks; an admission cock, a connecting cock, a withdrawal cock and an extraction cock. In addition, as the vessels are freed from gas in pairs, five periods are necessary to complete one cycle.

Figure 7:
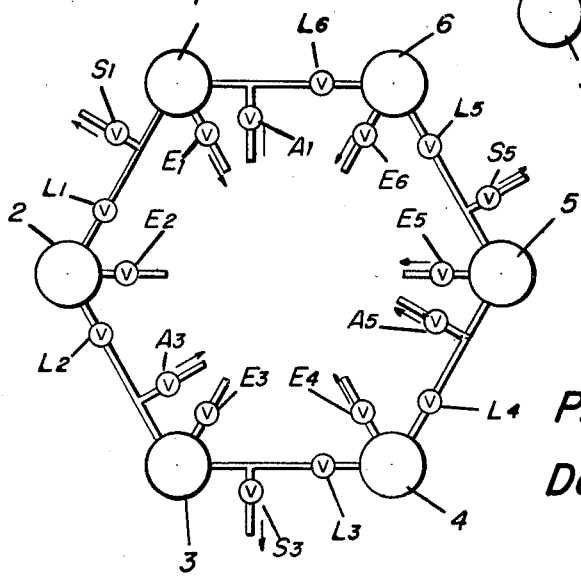

It is possible to reduce the number of these cocks by increasing the number of vessels by one. FIGURE 7 shows such a grouping of six vessels, which only comprises 18 cocks, instead of 20. Every other vessel is in fact equipped with only two cocks; a connecting cock and an extraction cock. The cycle is also simpler, because three periods are sufficient to complete the cycle; it is thus easier to make it automatic.

As in FIGURE 6, two vessels are always in the course of being degasified, while three others operate in the manner of the arrangement shown in FIGURE 4: in addition, however, one vessel is always at rest or preferably is subjected to a supplementary degasification so as to permit the shortening of the main degasification process.

Numerous other associations and groupings of the vessels can of course be provided without departing from the scope of the invention, by varying the number of intermediate pressures, the number of vessels corresponding to each intermediate pressure or the method of permutation of the vessels.

It is also possible for the zeolite 5A to be replaced by the zeolite 13X or 10X, or by any other adsorbent having the fundamental properties which have been hereinbefore defined.

What we claim is:

1. A cyclic process for separating a binary gas mixture by means of an adsorbent capable of adsorbing at a given temperature different quantities of two component gases at a fairly high speed with respect to the speed of extra-granular diffusion of the mixture into a bed of the adsorbent and capable of having the gases removed therefrom at said given temperature, comprising the steps of:

admitting under pressure a given quantity of said gas mixture at a given temperature into a first zone of a first closed chamber which contains a quantity of said adsorbent free from said gas mixture, then discontinuing the admission of said gas mixture into said first chamber;

shortly thereafter, before the composition of the unadsorbed gas mixture can have equalized by extragranular diffusion, withdrawing part of said gas mixture from said first chamber at a second zone spaced from said first zone and introducing said part into a first zone of a second closed chamber which contains a quantity of said adsorbent until the pressures in said chambers are balanced;

shortly thereafter, before the composition of the unadsorbed gas mixture can have equalized by extragranular diffusion, withdrawing a first gas fraction, without the admission of another given quantity of said gas mixture into said first chamber, from said chambers through a second zone of said second chamber spaced from said first zone of said second chamber, thus lowering the pressures of said chambers, then discontinuing the withdrawal of said first gas fraction from said chambers; and extracting the residual gas fraction of at least said first chamber under the sole action of vacuum at a lower pressure and at a temperature substantially the same as said given temperature.

2. A cyclic process for separating a binary gas mixture by means of an adsorbent capable of adsorbing at a given temperature different quantities of two component gases at a fairly high speed with respect to the speed of extragranular diffusion of the mixture into a bed of the adsorbent and capable of having the gases removed therefrom at said given temperature, comprising the steps of:

(a) introducing into a closed chamber containing the adsorbent free from gas, through a first zone thereof, a given quantity of said gas mixture under pressure and at said given temperature, (b) discontinuing the introduction of said gas mixture into said chamber and shortly thereafter discharging from said chamber at a second zone thereof spaced from said first zone an unadsorbed gaseous fraction before the composition of the unadsorbed gas mixture in said closed chamber can be equalized by extragranular diffusion, thus lowering the pressure of the chamber, (c) extracting the residual gas fraction from the adsorbent in said chamber, under the sole action of vacuum and at a temperature substantially the same as said given temperature.

3. A process according to claim 1, in which, in a first period the residual gas fractions of both chambers are extracted by vacuum, and in a following period, the extraction of gas from the second chamber under vacuum is continued, while a fresh quantity of the mixture is admitted into the first chamber.

4. A process according to claim 1, in which, in a first period, the residual gas fraction of the first chamber only is extracted by vacuum and, in the following period, a fresh quantity of the mixture is admitted directly into the second chamber without previous removal of a residual gas fraction, the respective positions in the path of the gas mixture of the first and second chambers being then reversed.

5. A process according to claim 4, in which the gas mixture to be separated is admitted under such a pressure that, after completing the withdrawal from the two chambers, the residual gas fraction of the second chamber has a mean composition equal to that of the initial mixture.

6. A process according to claim 2, in which the binary gas mixture to be separated is a mixture of oxygen and nitrogen, the adsorbent is one of the zeolites from the group consisting of 5A, 13X and 10X, the working temperature is in the region of normal temperature and the lowest pressure is atmospheric pressure.

7. A process according to claim 1, in which, in a first period, $n$ identical vessels are grouped so as to constitute the first chamber, and one vessel constitutes the second chamber, and, in a following period, said one vessel and $n-1$ vessels of said $n$ identical vessels are grouped to constitute a first chamber, while the second chamber is constituted by the remaining vessel thereof, the gas mixture to be separated, during its admission, passing through this second chamber from which a residual gas fraction has not previously been removed.

References Cited in the file of this patent

UNITED STATES PATENTS

| | | |
|---|---|---|
| 2,254,799 | Erdmann | Sept. 2, 1941 |
| 2,661,808 | Kahle | Dec. 8, 1953 |
| 2,765,868 | Parks | Oct. 9, 1956 |
| 2,810,454 | Jones et al. | Oct. 22, 1957 |
| 2,882,244 | Milton | Apr. 14, 1959 |
| 2,901,519 | Patterson et al. | Aug. 25, 1959 |
| 2,944,627 | Skarstrom | July 12, 1960 |

OTHER REFERENCES

"Journal of the American Chemical Society," volume 65, July 9, 1943, No. 7, pages 1253 to 1262.